United States Patent [19]

Kono et al.

[11] Patent Number: 5,471,126
[45] Date of Patent: Nov. 28, 1995

[54] SLIP FREQUENCY CONTROL METHOD FOR INDUCTION MOTORS

[75] Inventors: Shinichi Kono; Masaaki Fukukura, both of Oshino, Japan

[73] Assignee: Fanuc Ltd., Minamitsuru, Japan

[21] Appl. No.: 181,873

[22] Filed: Jan. 13, 1994

Related U.S. Application Data

[63] Continuation of Ser. No. 566,472, filed as PCT/JP89/01297, Dec. 25, 1989, abandoned.

[30] Foreign Application Priority Data

Dec. 24, 1988 [JP] Japan ................... 63-324795

[51] Int. Cl.⁶ .................................................. H02P 7/00
[52] U.S. Cl. .............................................. 318/807; 318/799
[58] Field of Search ...................... 318/800–803, 318/806, 807, 808, 810, 805, 52, 727, 809, 799

[56] References Cited

U.S. PATENT DOCUMENTS

| | | | |
|---|---|---|---|
| 4,361,794 | 11/1982 | Kawada et al. | 318/807 |
| 4,459,534 | 7/1984 | Nagase et al. | 318/808 |
| 4,484,126 | 11/1984 | Fulton et al. | 318/808 |
| 4,677,361 | 6/1987 | Yonemoto | 318/803 |
| 4,680,526 | 6/1987 | Okuyama et al. | 318/808 |
| 4,752,725 | 6/1988 | Ominato | 318/807 |
| 4,792,741 | 12/1988 | Matsuo et al. | 318/800 |
| 4,818,927 | 4/1989 | Hino et al. | 318/798 |
| 4,862,343 | 8/1989 | Nomura et al. | 318/802 |
| 5,003,243 | 3/1991 | Tadakuma et al. | 318/800 |
| 5,032,771 | 7/1991 | Kerkman et al. | 318/805 |

FOREIGN PATENT DOCUMENTS

| | | |
|---|---|---|
| 0214301A1 | 3/1987 | European Pat. Off. . |
| 60-70987A | 4/1985 | Japan . |

*Primary Examiner*—William M. Shoop, Jr.
*Assistant Examiner*—John W. Cabeca
*Attorney, Agent, or Firm*—Staas & Halsey

[57] ABSTRACT

A slip frequency control method for induction motors, capable of achieving accurate control and excellent in control response.

To effect determination of a slip frequency (fs) and an excitation magnetic flux frequency ($\omega 0$) by software processing to reduce a control error and a control delay caused if hardware elements are employed for the determination of these parameters, a vector control processor divides, in a speed control routine (101–104), the sum of a slip frequency, obtained by dividing the product of a secondary current command (I2) and a proportional constant (K2) by an excitation magnetic flux command ($\Phi$), and a remainder ($\alpha'$) in the preceding routine by a routine executing frequency (CV), so as to derive a slip amount (A) and a remainder ($\alpha$) in the present routine. In a current control routine (201 to 205) executed at intervals of a period shorter than that of the speed control routine, the processor divides the sum of the derived slip amount and the remainder ($\beta'$) in the preceding routine by the number (n) of execution of the current control, to thereby derive slip distribution data ($\omega s$) and a remainder ($\beta$) in the present current control routine, and further adds data ($\omega r$) indicative of an actual motor speed to the derived slip distribution data, to thereby derive an excitation magnetic flux frequency ($\omega 0$).

5 Claims, 3 Drawing Sheets

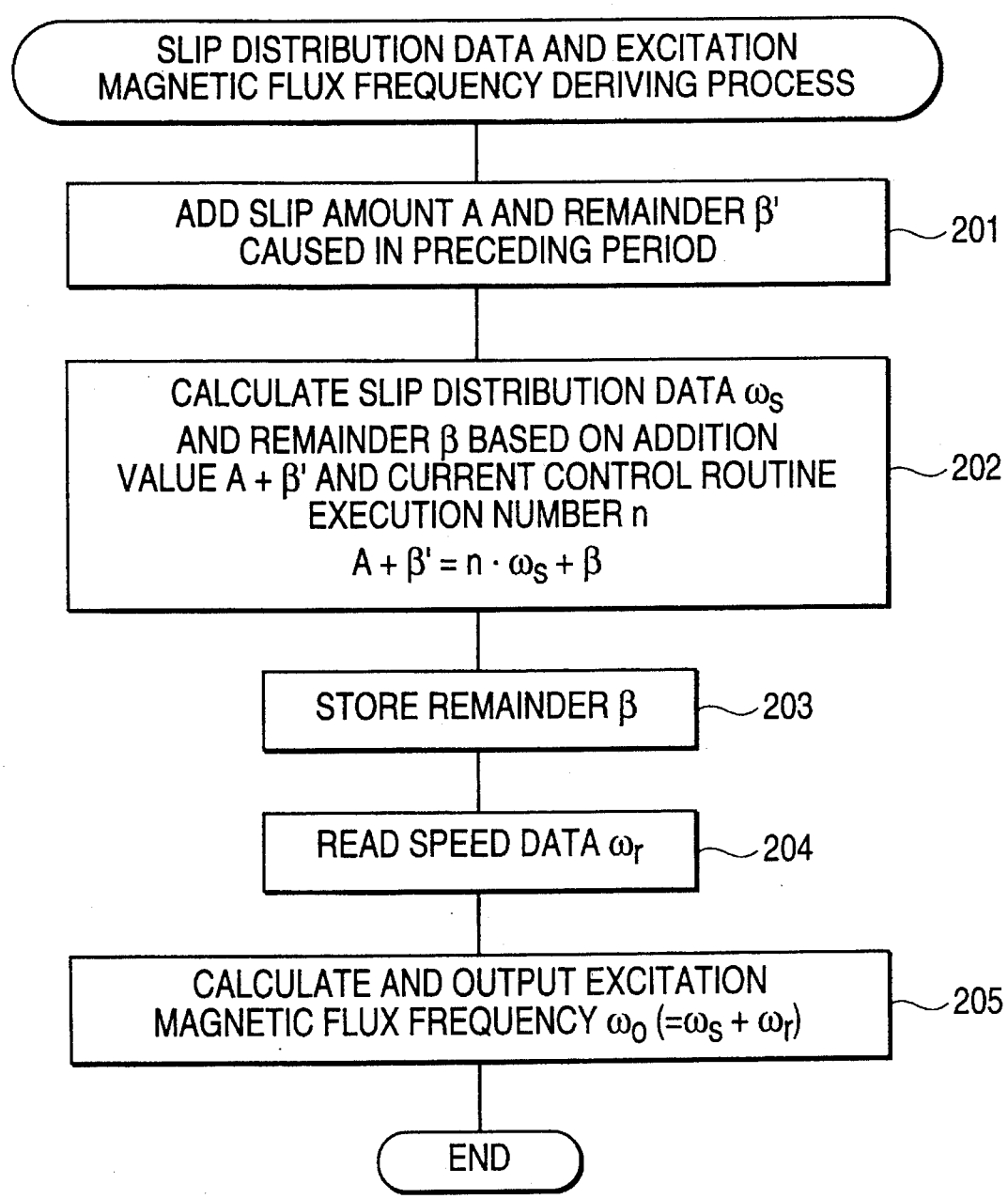

SLIP FREQUENCY CONTROL METHOD FOR INDUCTION MOTORS

This application is a continuation, of application Ser. No. 07/566,472, filed as PCT/JP89/01297, Dec. 25, 1989, now abandoned.

TECHNICAL FIELD

The present invention relates to a slip frequency control method for induction motors, and more particularly, to a control method of this type capable of performing accurate slip frequency control and excellent in control response.

BACKGROUND ART

In an induction motor arranged to rotate at a speed lower than a rotating magnetic field or rotate with a slip, it is known to control the slip frequency, so as to variably control the rotation speed of the motor. Also known is to perform vector control for adjusting an excitation current supplied to the stator and the magnitude and direction of a secondary current supplied to the rotor, to thereby improve dynamic operation and control characteristics of the motor.

FIG. 4 shows, by way of example, a conventional vector control system for a 3-phase induction motor, wherein a 3-phase induction motor 6 is provided with a speed detector 7 for detecting an actual rotation speed ωr of the motor, and current detectors CTU, CTV and CTW for detecting actual currents of respective phases of the motor.

In the control system of FIG. 4, the difference between a speed command Vc read out from a program (not shown) by a vector control processor (not shown) and an actual speed ωr detected by the speed detector 7 is amplified by an amplifier 1, to thereby derive a torque command T. This command T is divided in an element 2 by an excitation magnetic flux command Φ supplied from an element 8 to derive a secondary current command I2. Then, the product of a proportional constant K2 and the secondary current command I2 is divided in an element 10 by the excitation magnetic flux command Φ to derive the slip frequency ωs. More specifically, the element 10 is comprised of hardware. For example, the element 10 consists of two frequency dividers whose frequency dividing ratios are respectively set to values K2I2 and 1/Φ in a software fashion, and in this case, the frequency of a reference clock signal for the vector control is divided in these frequency dividers, to thereby derive a slip frequency ωs (=K2I2/Φ).

Further, in the control system of FIG. 4, the slip frequency ωs and the actual speed ωr are added together by an adder 11 to derive an excitation magnetic flux frequency ω0, and the excitation magnetic flux command Φ is divided in an element 9 by a proportional constant K1 to derive an excitation current component I0. A current calculation circuit 3 determines a primary current I1 on the basis of the excitation current component I0 and the secondary current command I2, and a 3-phase converter 4 determines current commands for the respective phases IU (=I1×sinω0t), IV (=I1×sin(ω0t−2π/3)) and IW (=I1×sin(ω0t−4π/3)) on the basis of the primary current command I1 and excitation magnetic flux frequency ω0. Furthermore, a current controller 5 effects current control so that the differences between actual currents detected by the current detectors CTU, CTV and CTW and the current commands IU, IV and IW are reduced to zero.

However, according to the aforesaid conventional vector control system whose slip frequency determining element 10 is comprised of hardware, there occurs a slight slip frequency ωs attributable to characteristics of the hardware even when the secondary current command I2 is zero. Therefore, an error occurs in the slip frequency control. Further, since the reference clock signal is divided by the two frequency dividers after the frequency dividing ratios of the frequency dividers are set to K2I2 and 1/Φ in accordance with the secondary current command I2 and excitation magnetic flux command Φ, a certain time period is required from an instant at which the commands I2 and Φ are generated to an instant at which a slip actually occurs. Therefore, the response in the slip control is lowered.

DISCLOSURE OF THE INVENTION

An object of the present invention is to provide a slip frequency control method for induction motors capable of performing precise slip frequency control and excellent in control response.

In order to achieve the above object, according to one aspect of the present invention, a slip frequency control method comprises the steps of: (a) deriving a slip frequency on the basis of a secondary current command and an excitation magnetic flux command in a speed control routine; (b) deriving a slip amount for one period of the speed control routine on the basis of the derived slip frequency; (c) deriving slip distribution data for one period of a current control routine on the basis of the derived slip amount; and (d) adding speed data indicative of an actual speed of an induction motor to the derived slip distribution data, to derive an excitation magnetic flux frequency.

According to another aspect of the present invention, a slip frequency control method comprises the steps of (a) periodically executing a speed control routine, and (b) periodically executing a current control routine, The step (a) includes a step (a1) of calculating a slip frequency on the basis of a secondary current command and an excitation magnetic flux command, and a step (a2) of calculating a slip amount in the present period of the speed control routine, by dividing the sum of the calculated slip frequency and a remainder, caused in the slip amount calculation in the preceding period of the speed control routine, by a speed control routine execution frequency, and of calculating a remainder caused in the slip amount calculation. The step (b) includes a step (b1) of calculating slip distribution data in the present period of the current control routine, by dividing the sum of the calculated slip amount and the remainder caused in the distribution data calculation in the preceding period of the current control routine, by a number of the execution of the current control routine in the speed control routine, and of calculating a remainder caused by the slip distribution data calculation, and a step (b2) of adding speed data indicative of an actual speed of an induction motor to the calculated slip distribution data, to derive an excitation magnetic flux frequency.

As described above, according to the slip frequency control method of the present invention, a slip amount for one period of the speed control routine is derived on the basis of that slip frequency which is derived from the secondary current command and the excitation magnetic flux command, and an excitation magnetic flux frequency is derived in accordance with that slip distribution data of one period of the current control routine which is derived from the derived slip amount. Alternatively, a slip amount in the speed control routine of the present cycle is obtained by dividing the sum of the derived slip frequency and the remainder caused in the speed control routine of the preceding cycle by the speed control routine execution frequency, and an excitation magnetic flux frequency is derived on the basis of slip distribution data in the current control routine of the present cycle derived by dividing the sum of the derived slip amount and the remainder caused in the current control routine of the preceding cycle by the number of times the current control routine is executed. Accordingly, the slip frequency and the excitation magnetic flux frequency can be determined by software processing, and hence the provision of a hardware element such as a frequency divider is unnecessary. As a result, the cost of the control system can be reduced, and, unlike the case wherein the hardware element is used, the slip frequency immediately becomes zero when the secondary current command becomes zero, and thus a change in the current phase is prevented. Therefore, the control at the time of motor shutdown is stabilized, thereby making it possible to increase the control gain. Further, a time period from an instant at which the secondary current command and the excitation magnetic flux command are generated to an instant at which the slip actually occurs can be reduced, whereby the control response can be improved.

BRIEF DESCRIPTION OF THE DRAWINGS

FIG. 2 is a flowchart showing a slip distribution data and excitation magnetic flux deriving process in a current control routine executed by the processor;

BEST MODE OF CARRYING OUT THE INVENTION

Figure 1:
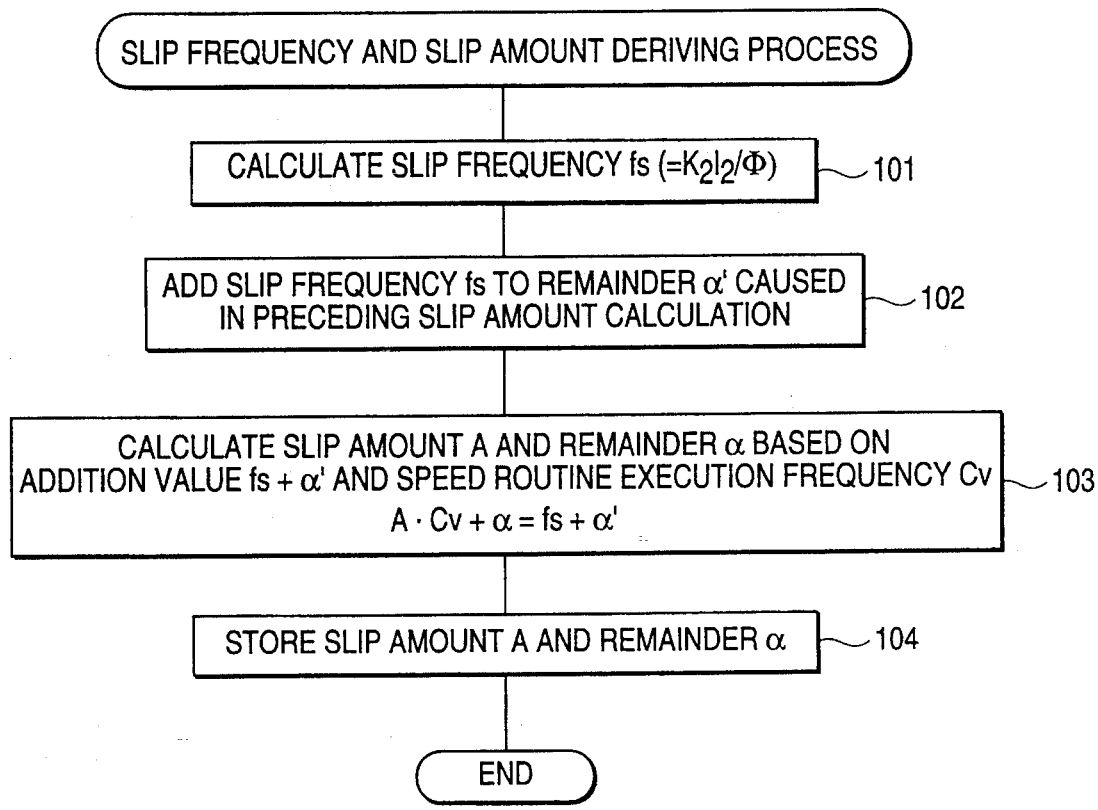
FIG. 1 is a flowchart showing a slip frequency and slip amount deriving process in a speed control routine executed by a vector control processor to which a slip frequency control method according to one embodiment of the present invention is applied.
Figure 3:
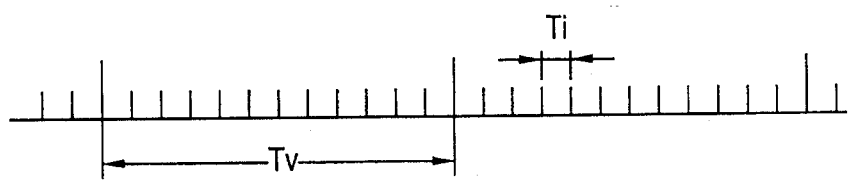
FIG. 3 is a timing chart showing a first timer output for starting the speed control routine and a second timer output for starting the current control routine.

With reference to FIGS. 1–3, a slip frequency control method according to one embodiment of the present invention will be explained.

Figure 4:
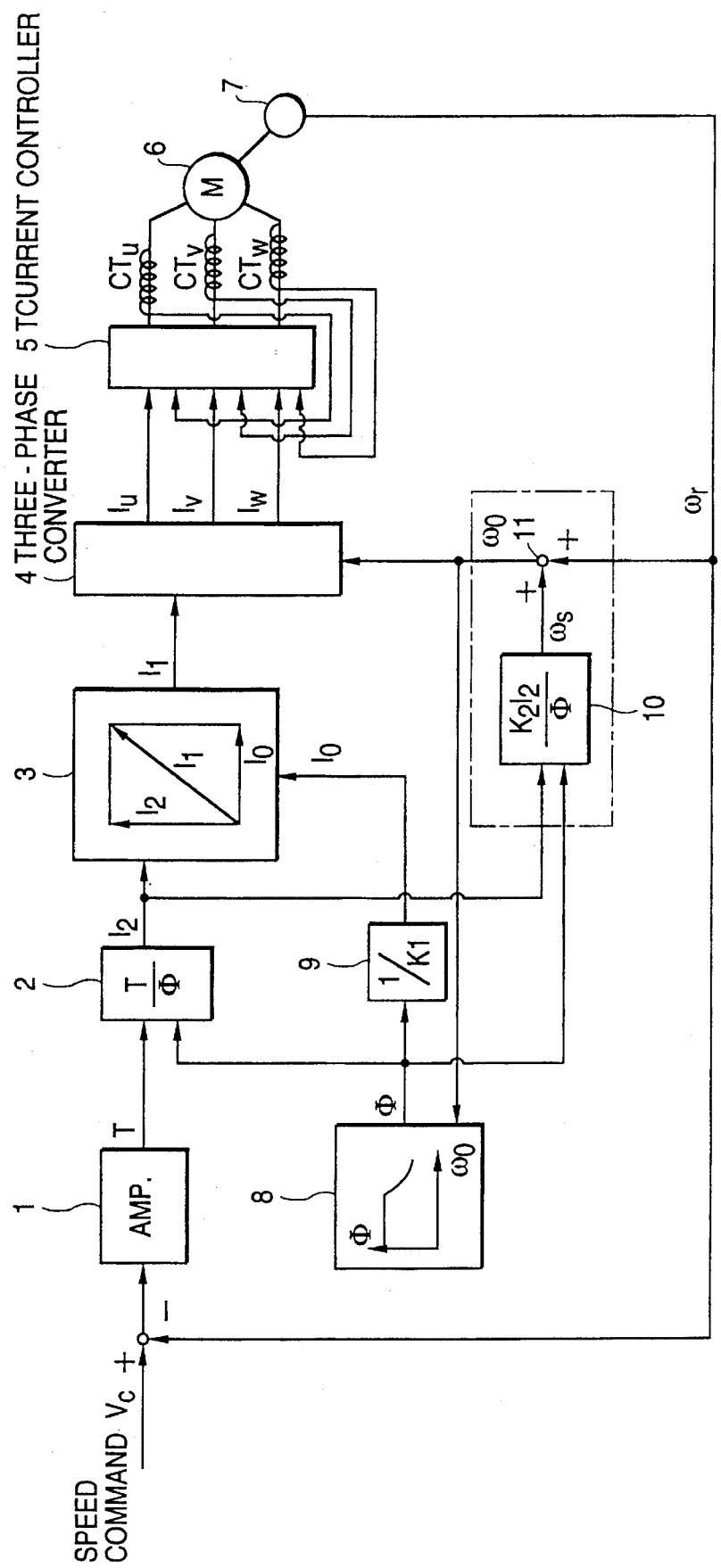
FIG. 4 is a block diagram showing a conventional vector control system for a 3-phase induction motor.

The control method of the present embodiment is embodied by a vector control system, which is substantially the same in construction as the conventional system of FIG. 4. However, the system of this embodiment is arranged to execute software processing to derive the slip frequency $\omega s$ and the excitation magnetic flux frequency $\omega 0$, unlike the system of FIG. 4 using the hardware elements 10, 11 for deriving these parameters $\omega s$, $\omega 0$. In this respect, a processor for vector control of the system is responsive to first and second software timer outputs generated at intervals of first and second predetermined periods TV and Ti, to permit interruptions so as to repeatedly start the speed control routine and the current control routine, and is arranged to execute slip control parameter deriving processes of FIGS. 1 and 2 in these control routines. Preferably, as shown in FIG. 3, the first timer output is generated at intervals of a period TV which is n times a generation period Ti of the second timer output, and in synchronism with the second timer output.

In the slip frequency and slip amount deriving process (FIG. 1) included in the speed control routine, the vector control processor derives slip frequency fs by dividing that value K2·I2, which is obtained by multiplying the secondary current command I2 by the proportional constant K2, by the excitation magnetic flux command $\Phi$ as shown in the following equation (1) (step 101).

$$fs = K2 \cdot I2 / \Phi \quad (1)$$

Next, the processor adds a remainder $\alpha'$ caused in a slip amount derivation (described later) in the speed control routine of the preceding period to the derived slip frequency fs (step 102). Then, according to the following equation (2), the addition result fs+$\alpha'$ is divided by a speed control routine execution frequency CV, to derive a slip amount A and a remainder $\alpha$ in the speed control routine of the present period (step 103). That is, the slip amount A is determined such that the slip amount per second corresponds to the slip frequency. The initial value of the remainder $\alpha$ is set beforehand to a value of "0".

$$fs + \alpha' = A \cdot CV + \alpha \quad (2)$$

The processor stores the derived slip amount A and the remainder $\alpha$ (the remainder $\alpha'$ in the next period) into first and second registers accommodated in the processor (step 104), and then the speed control routine of the present period is completed.

On the other hand, in the slip distribution data and excitation magnetic flux frequency deriving process (FIG. 2) included in the current control routine, the processor adds the remainder $\beta'$, caused in the slip distribution data calculation (described later) in the current control routine of the preceding period, to the slip amount A, derived as described above in the speed control routine which includes the current control routine (step 201). Further, the addition result A+$\beta'$ is divided by the number n (=12) of times the current control routine is executed in one period of the speed control routine, according to the following equation (3), to derive slip distribution data $\omega s$ and the remainder $\beta$ in the current control routine of the present period (step 202). That is, the slip distribution data $\omega s$ is determined to keep the slip amount uniform throughout the one speed control period. 10 The initial value of the remainder $\beta$ is set beforehand to a value of "0".

$$A + \beta' = \omega s \cdot n + \beta \quad (3)$$

Then, the processor stores the derived slip distribution data es and the remainder $\beta$ (the remainder $\beta'$ in the next period) into third and fourth registers. (step 203). Next, the processor reads actual speed data $\omega r$ supplied from a speed detector corresponding to the element 7 in FIG. 4 (step 204), adds the data $\omega r$ to the slip distribution data $\omega s$ to derive an excitation magnetic flux frequency $\omega 0$ as indicated by the following equation (4), and then outputs the derived value $\omega 0$ to a 3-phase converter corresponding to the element 3 in FIG. 4 (step 205).

$$\omega 0 = \omega s + \omega r \quad , \quad (4)$$

The vector control processor repeatedly executes the deriving processes shown in FIGS. 1 and 2 in response to the first and second timer outputs.

As described above, according to the method of this embodiment controlling each phase current of the motor 6 in accordance with the slip amount A derived by the software processing for each speed control routine executing period TV, it is possible to reduce a time period from an instant at which the secondary current command I2 is generated to an instant at which a slip actually occurs. Therefore, the control response can be improved. Further, when the secondary current command I2 becomes zero, the derived slip amount A and consequently the derived slip frequency fs immediately become zero, thus improving the control stability at the time of motor shutdown. In addition, since the distribution data ωs and the excitation magnetic flux frequency ω0 are derived by the software processing for each current control routine executing period Ti which is considerably shorter than the period TV, a variation in the data ωs and ω0 with elapse of time can be prevented, making it possible to keep the uniformity of these data.

Shown hereinbelow are variation patterns of the slip amount A and the remainder α in the speed control routine of each period, and variation patterns of the slip distribution data ωs and the remainder β in the current control routine of each period, in case that the speed control routine executing period TV and the current control routine executing period Ti are respectively set to 2 msec and 167 μsec, that is, the speed control routine executing frequency Ci and current control routine executing frequency CV are respectively set to 500 Hz and 6 KHz, thereby controlling the slip frequency fs to 2,750 Hz. In this example, the number n (=TV/Ti) of times the current control routine is executed in one speed control routine executing period TV is "12".

SPEED CONTROL ROUTINE IN THE FIRST PERIOD

Slip amount A=5 (=2750/500)

Remainder α=250

The slip distribution data ωs and the remainder β in the current control routine of the first to twelfth periods vary as shown in the following TABLE 1.

TABLE 1

| CURRENT CONTROL ROUTINE | SLIP DISTRIBU- TION DATA ω s | REMAINDER β |
| --- | --- | --- |
| First Period | 0 (=5/12) | 5 |
| Second Period | 0 (=(5 + 5)/12) | 10 |
| Third Period | 1 (=(5 + 10)/12) | 3 |
| Fourth Period | 0 (=(5 + 3)/12) | 8 |
| Fifth Period | 1 (=(5 + 8)/12) | 1 |
| Sixth Period | 0 (=(5 + 1)/12) | 6 |
| Seventh Period | 0 (=(5 + 6)/12) | 11 |
| Eighth Period | 1 (=(5 + 11)/12) | 4 |
| Ninth Period | 0 (=(5 + 4)/12) | 9 |
| Tenth Period | 1 (=(5 + 9)/12) | 2 |
| Eleventh Period | 0 (=(5 + 2)/12) | 7 |
| Twelfth Period | 1 (=(5 + 7)/12) | 0 |

SPEED CONTROL ROUTINE IN THE SECOND PERIOD

Slip amount A=6 (=(2750+250)/500)

Remainder α=0

The slip distribution data ωs and the remainder β in the current control routine of the first to twelfth periods vary as shown in the following TABLE 2.

SPEED CONTROL ROUTINE IN THE THIRD PERIOD

Slip amount A=5 (=(2750+0)/500)

Remainder α=250

Variation patterns of the slip distribution data ωs and the remainder β are the same as those in the speed control routine of the first period shown in the above TABLE 1.

SPEED CONTROL ROUTINE IN THE FOURTH PERIOD

Slip amount A=6 (=(2750+250)/500)

Remainder α=0

Variation patterns of the slip distribution data ωs and the remainder β are the same as those in the speed control routine of the third period shown in TABLE 2.

TABLE 2

| CURRENT CONTROL ROUTINE | SLIP DISTRIBU- TION DATA ω s | REMAINDER β |
| --- | --- | --- |
| First Period | 0 (=(6 + 0)/12) | 6 |
| Second Period | 1 (=(6 + 6)/12) | 0 |
| Third Period | 0 (=(6 + 0)/12) | 6 |
| Fourth Period | 1 (=(6 + 6)/12) | 0 |
| Fifth Period | 0 (=(6 + 0)/12) | 6 |
| Sixth Period | 1 (=(6 + 6)/12) | 0 |
| Seventh Period | 0 (=(6 + 0)/12) | 6 |
| Eighth Period | 1 (=(6 + 6)/12) | 0 |
| Ninth Period | 0 (=(6 + 0)/12) | 6 |
| Tenth Period | 1 (=(6 + 6)/12) | 0 |
| Eleventh Period | 0 (=(6 + 0)/12) | 6 |
| Twelfth Period | 1 (=(6 + 6)/12) | 0 |

As described above, eleven pulses are output for every two periods (=4 msec) of the speed control routine. Hence, 2,750 (=11/2×500) pulses are output uniformly with elapse of time, as slip distribution data ωs, for every 500 speed control routines (=1 sec). Thus, the resultant slip frequency fs is 2,750 Hz.

We claim:

1. A slip frequency control method for an induction motor, comprising the steps of:

(a) deriving slip frequency data on the basis of a secondary current command generated based on a torque command determined by a difference between an actual speed of the induction motor and a speed command, and an excitation magnetic flux command, in a speed control software routine;

(b) deriving slip amount data for the one period of the speed control software routine on the basis of the derived slip frequency data;

(c) deriving slip distribution data for one period of a current control software routine on the basis of the derived slip amount data;

(d) adding speed data indicative of the actual speed of the induction motor to the derived slip distribution data, to derive excitation magnetic flux frequency data; and (e) controlling the induction motor based on the excitation magnetic flux frequency data.

2. A slip frequency control method according to claim 1, wherein said steps (a) to (d) are executed by a vector control processor provided in a control system to which said slip frequency control method is applied.

3. A slip frequency control method for an induction motor, comprising the steps of:

(a) periodically executing a speed control software routine;

(b) periodically executing a current control software routine; and (c) controlling the induction motor based on excitation magnetic flux frequency data;

said step (a) including steps of (a1) calculating slip frequency data on the basis of a secondary current command generated based on a torque command determined by a difference between an actual speed of the induction motor and a speed command, and an excitation magnetic flux command, and (a2) calculating slip amount data in the present period of the speed control software routine, by dividing the sum of the calculated slip frequency data and remainder data, caused in the slip amount calculation in the preceding period of the speed control software routine, by speed control software routine execution frequency data, and of calculating remainder data caused by the slip amount calculation in the present period; and said step (b) including steps of (b1) calculating slip distribution data in the present period of the current control software routine, by dividing the sum of the derived slip amount data and the remainder, caused in the slip distribution data calculation in the preceding period of the current control software routine, by a number of the execution of the current control software routine in the speed control software routine, and of calculating the remainder data caused by the slip distribution data calculation in the present period, and (b2) adding speed data indicative of the actual speed of the induction motor to the derived slip distribution data, to derive the excitation magnetic flux frequency data.

4. A slip frequency control method according to claim 3, wherein said steps (a) and (b) are executed by a vector control processor provided in a control system to which said slip frequency control method is applied.

5. A slip frequency control method according to claim 3, wherein said current control software routine is executed plural times in one execution period of said speed control software routine.

* * * * *

UNITED STATES PATENT AND TRADEMARK OFFICE
CERTIFICATE OF CORRECTION

PATENT NO. : 5,471,126
DATED : November 28, 1995
INVENTOR(S) : Shinichi KONO et al.

It is certified that error appears in the above-indentified patent and that said Letters Patent is hereby corrected as shown below:

Column 4, line 40, delete "10"; and line 46, change "es" to --ws--.

Signed and Sealed this

Twelfth Day of March, 1996

Attest:

BRUCE LEHMAN

Attesting Officer    Commissioner of Patents and Trademarks